UNITED STATES PATENT OFFICE.

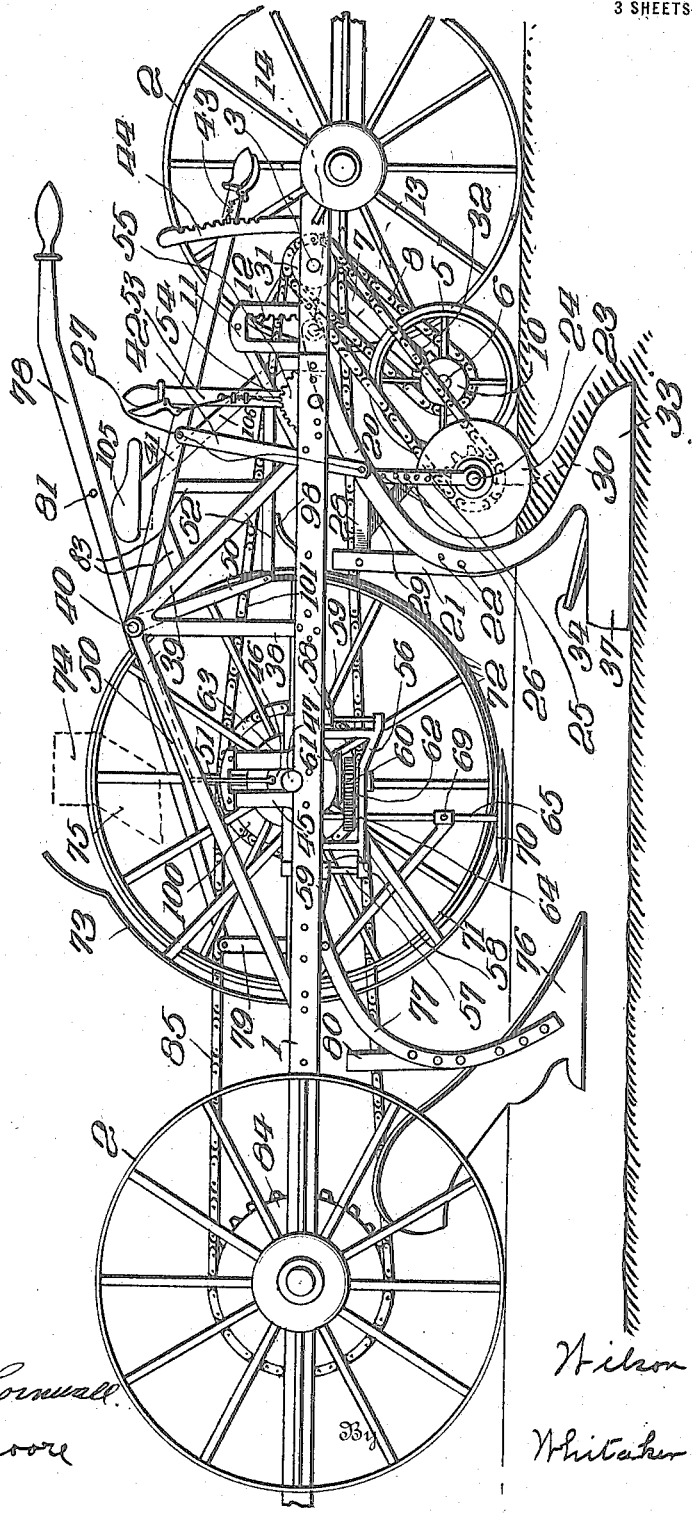

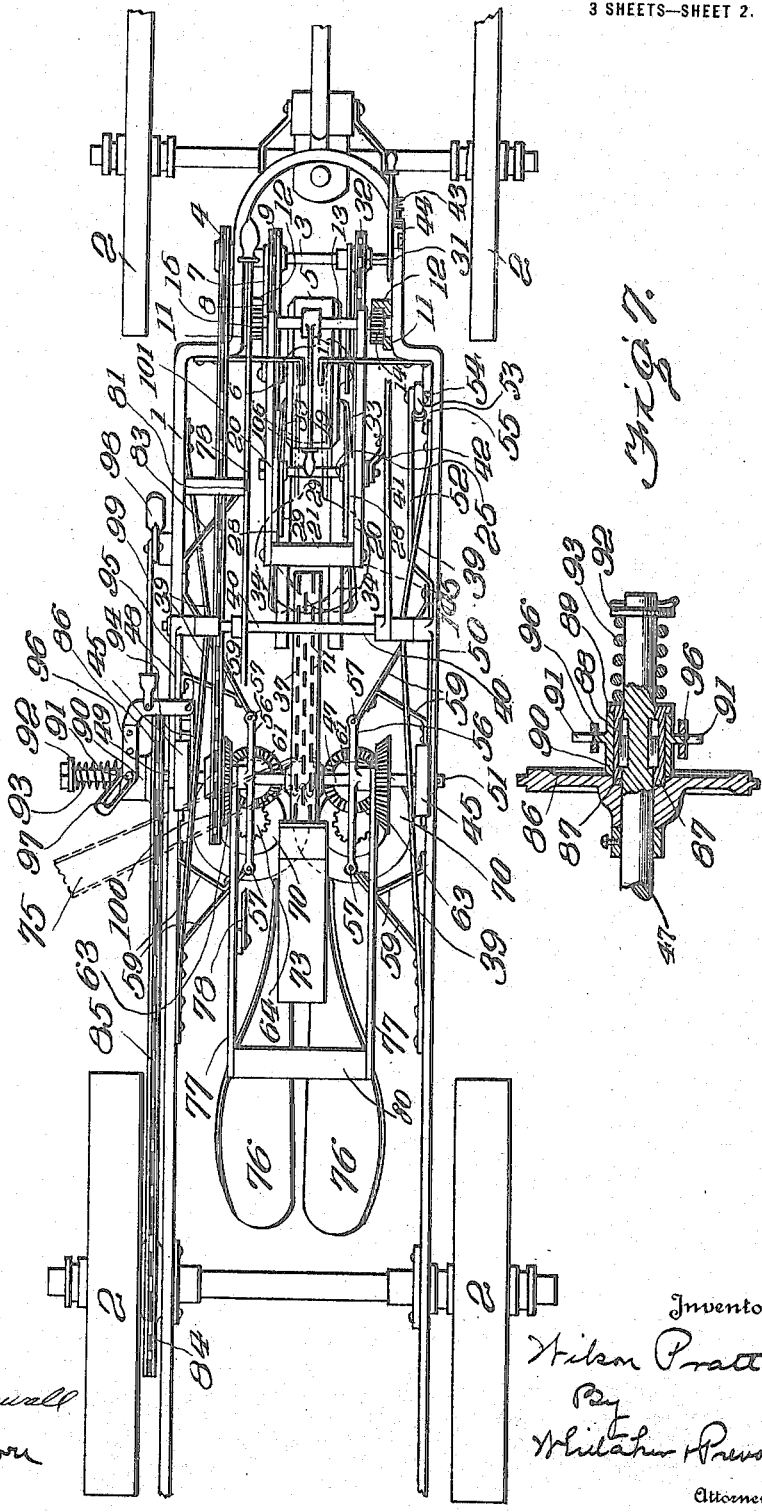

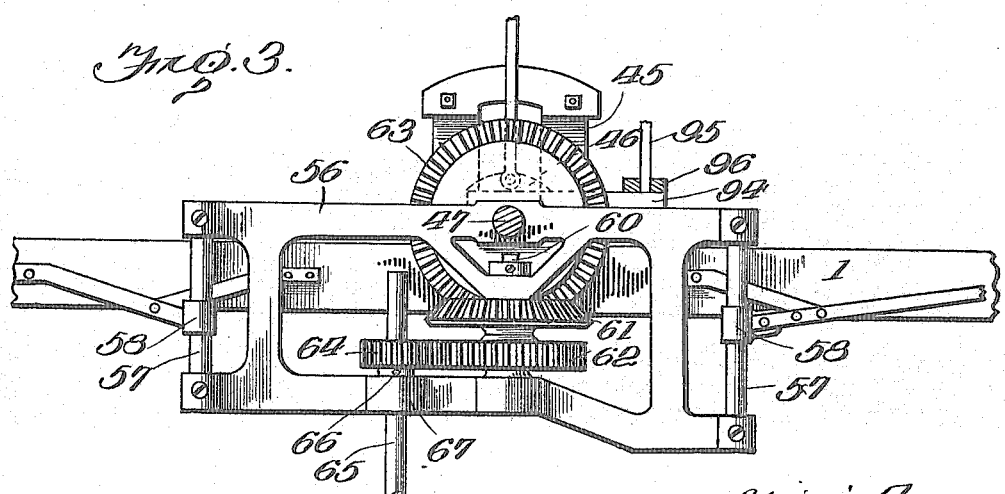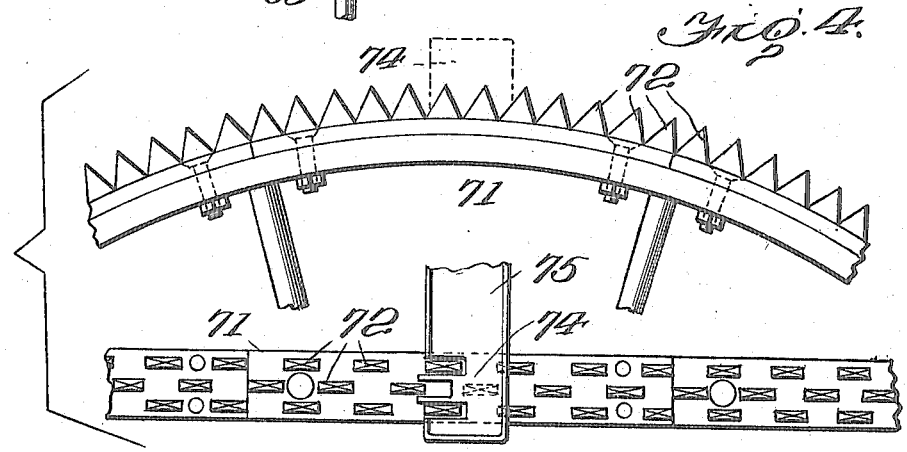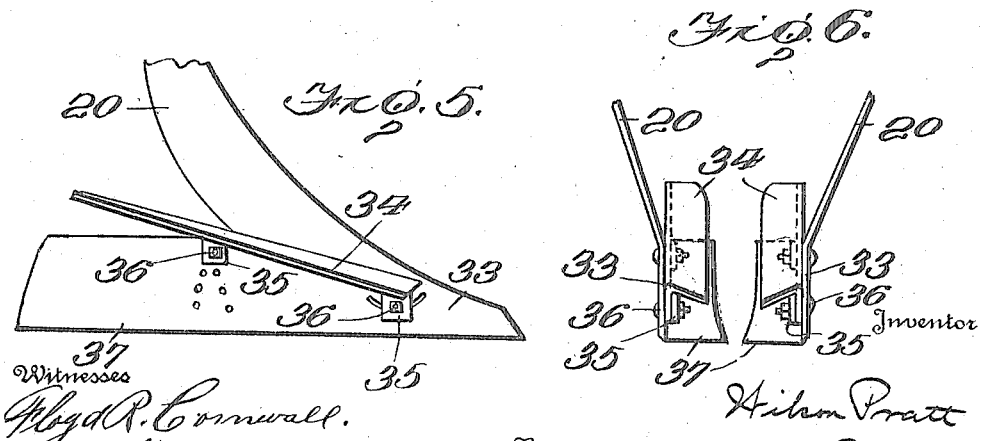

WILSON PRATT, OF SALT LAKE CITY, UTAH.

BEET-HARVESTER.

1,271,076.    Specification of Letters Patent.    Patented July 2, 1918.

Application filed September 11, 1916. Serial No. 119,461.

*To all whom it may concern:*

Be it known that I, WILSON PRATT, a citizen of the United States, residing at Salt Lake City, in the county of Salt Lake and State of Utah, have invented certain new and useful Improvements in Beet-Harvesters; and I do hereby declare the following to be a full, clear, and exact description of the invention, such as will enable others skilled in the art to which it appertains to make and use the same.

My invention consists in the novel features hereinafter described, reference being had to the accompanying drawings, in which I have illustrated one form of my invention selected by me for purposes of illustration, and the said invention is fully disclosed in the following description and claims.

Referring to the drawings:—

Figure 1 is a side view of my beet harvester, certain portions of which are broken away for the purpose of clearness.

Fig. 2 is a top plan view of the same, also having portions broken away.

Fig. 3 is a detail showing one of the vertically adjustable frames which carry the beet leveling and top carrying wheel, and topping mechanism.

Fig. 4 is a fragmentary detail showing a side and top view of a portion of the beet leveling and top carrying wheel, and also showing a portion of the chute which conveys the beet tops to one side of the machine.

Fig. 5 is a side view of one of the pair of plows, which are used to elevate the beets a sufficient distance to be properly acted on by the beet leveling and top carrying wheel.

Fig. 6 is a front view of the elevating plows, showing the elevating members and the conformation of the rear of the plows which pack the earth beneath and at the sides of the beets after they have been elevated by the elevating members.

Fig. 7 is a detail partly in section, of the clutch employed for throwing the beet leveling and topping mechanism into and out of operation, and also for throwing the leaf flattening roller and leaf cutting disks into and out of operation.

The object of my invention is to provide an improved machine for harvesting beets and which is adapted to be drawn over the rows of beets. In my machine, I have mechanism which first flattens the beet leaves horizontally, then trims the lateral edges of the flattened leaves so that they will not clog up or interfere with the mechanism which afterward operates on the beets, then elevates the beets a predetermined distance and packs the earth beneath and at the sides of the same, so that they will not drop back into the position which they first occupied, then forces the beets back into the earth until their crowns are at a uniform height or level, then immediately cuts the tops from the beets and elevates said tops, and finally plows the topped beets from the ground.

With this mechanism each of the beets has the same amount of top removed, without bruising or injuring the beets.

A further object of my invention is to provide mechanism which will overcome the irregularity in height in which the beets stand in the row, and cut or top the same at a certain distance below the crown of the beet, which distance may be regulated to a certain extent.

With the foregoing objects outlined, and with other objects in view, it will be apparent as the nature of the invention is better understood, that the present invention resides in the combination and arrangement of parts, and in the details of construction, it being understood that changes in the precise embodiment of the invention herein disclosed, can be made within the scope of what is claimed, without departing from the spirit of the invention or sacrificing any of its advantages.

In the drawings, 1 designates the frame of my improved beet harvester, which is mounted upon the traveling wheels 2 and is adapted to be drawn or propelled over the beet rows by horse power or motor.

Extending across the front of the frame, is a shaft 3, which is journaled in the sides of said frame for rotary movement and is provided on one end with a fixed sprocket, 4. A roller 5 of sufficient weight to flatten the beet leaves as the machine passes over the beet row, is rigidly mounted on a shaft 6 which is freely rotatable in bearings in the lower ends of links 7. The upper ends of said links are pivotally mounted on the shaft 3 and a sprocket chain 8 passes around fixed sprockets 9 and 10 on the shafts 3 and 6, so that said roller 5 is revolved by rotating the shaft 3, and is also capable of vertical movement with the links 7 to compensate for uneven height in beets.

Mounted on each side of the frame 1, slightly to the rear of the shaft 3, is an inverted U-shaped member 11, which has a vertical rack bar 12. A rotatable and vertically movable shaft 13 is provided at its ends with fixed collars 14, which engage the inner sides of the members 11, and with pinions 15, which engage the racks 12, so that each time the shaft 13 is rotated, the pinions moving on the racks will either raise or lower the shaft, depending on the direction in which the shaft is rotated. The means for rotating the shaft 13 comprise a lever 19 which is rigidly mounted on shaft 13. Each time the handle 19 is moved, it rotates the shaft 13. This mechanism is employed for raising the front ends of the elevating plow beams which are connected to said shaft 13 and which will now be described.

The elevating plow beams 20 are pivotally connected at their upper ends to the shaft 13 and are connected together near their rear ends by a yoke-shaped metal strap 21, which is secured to said beams by bolts 22. Cutting disks 23, for severing the lateral edges of the beet leaves after they have been flattened by the roller, are rigidly secured to opposite ends of a shaft 24, which is journaled in the lower ends of bars 25 which are suspended from the plow beams 20. Each of the bars 25 has a series of holes 26 through which pass pins 27 for adjustably securing the bars to the plow beams.

Brackets 28 are rigidly secured to the beams and strap 21 and carry brace rods 29 for the bars 25. Sprocket wheels 30 and 31 are rigidly secured to the shafts 24 and 3 and a sprocket chain 32 is passed around said sprockets for causing the disks 23 to rotate with the shaft 3.

The lower ends of the plow beams 20 are provided with shovels 33 which are adapted to cut along the opposite sides of the beet row and loosen the earth surrounding the beets and each of the shovels has an inclined plane or elevating bar 34 which is adapted to engage the beets beneath their largest circumference and elevate the same, together with the earth which surrounds them, to a predetermined vertical position. These elevating bars 34 are each provided with a pair of apertured depending lugs 35 which are adjustably secured to the shovels by means of bolts 36, so that the bars 34 may be adjusted to meet different conditions. The rear ends of the shovels 33 are turned inwardly toward one another, as shown at 37, whereby the earth beneath the beets is forced through the contracted opening between the rear ends of the shovels, to form a mound beneath and at the sides of the beets and thus hold the same in the position to which they have been raised by the elevating bars 34.

Supported above the frame 1 by posts 38 and braced by rods 39, is a shaft 40 to which is pivoted the rear end of the lifting lever 41. Said lever is connected to one of the plow beams 20 by a link 42 and is adapted to raise the elevating plows and cutting disks 23 to different vertical positions, and the lever is provided at its forward end with an ordinary detent device 43 which coöperates with a curved segment 44 extending upwardly from one side of the frame 1. By operating the detent 43 and raising the lever 41, the plow shovels and cutting disks may be elevated and retained in any desired position.

Mounted on each side of the frame intermediate its ends and to the rear of the elevating plows, is a guide bracket 45 and mounted in each of said guide brackets for vertical movement, is a bearing block 46 which blocks taken together, support a shaft 47. The means for raising and lowering said blocks 46 and shaft 47 comprise an arm 48 which is rigidly secured at one end to the shaft 40 and at its opposite end to the upper end of a link 49, which is secured to the block 46 on the left hand side of the machine. A bell crank lever 50 is also rigidly secured to the shaft 40 and has one of its ends connected to a link 51 that is secured to the block 46 on the right hand side of the machine. The other arm of said bell crank is pivotally connected to one end of a link 52 and the opposite end of said link 52 is connected to a lever 53, which is carried by the frame 1 and has an ordinary detent device 54 for engagement with a toothed segment 55, also carried by the frame. It will thus be seen that when the detent is moved out of engagement with the segment 55, and the lever 53 is swung toward the rear, the blocks 46 and shaft 47 will be raised, for a purpose hereinafter described.

The shaft 47 carries a plurality of supporting frames 56 which move with the shaft when said shaft is raised or lowered, and in order to prevent the frames 56 from swinging on the shaft, I have provided the ends of the frames with vertical posts 57 which slide in bearings 58 that are carried by brackets 59 extending inwardly from the sides of the frame 1. Mounted in each of the frames 56 is a vertical stub shaft 60 upon which is rigidly secured a bevel gear 61 and a pinion 62. The bevel gears 61 are in mesh with and driven by bevel gears 63 which are rigid on the shaft 47, and the pinions 62 drive pinions 64 which are adjustably secured on vertical shafts 65 by means of set screws 66. The shafts 65 rotate and are longitudinally movable in bearings 67 in the frames 56 and braces 68 extend inwardly and downwardly from the sides of the frame 1 and carry at their lower ends, bearings 69 which assist in supporting and guiding said shafts 65. Each of the shafts 65 carries at its lower end, a horizontally arranged cutting disk 70 for topping the beets and said disks 70 may be adjusted relative to the frames 56 by operating the set screws 66.

Rigidly mounted upon the center of the shaft 47 and rotating between the frames 56 is a leveling wheel 71, which is provided on its periphery with knives or spikes 72 (as best shown in Fig. 4). After the beets have been elevated by the elevating bars 34, their crowns are pierced by the knives or spikes 72 and the beets are forced back into the soft earth until their crowns are at a uniform height or level, at which time the topping disks 70 operate on the beets and cut them the same distance below their crowns throughout the entire row.

The crowns or tops of the beets, after they have been severed from the beets, are retained by the spikes 72 and elevated, this operation being assisted by a curved guard or guide 73, which is arranged a slight distance from the periphery of the wheel 71 and prevents the tops from falling off the spikes until they are engaged by a scraper 74 that is carried by a conveying chute 75 and scrapes the beet tops from the wheel and deposits them in the chute, by which they are conveyed over one side of the machine frame 1. The guard 73 and chute 75 are suitably supported from the sides of the machine frame by suitable brackets or the like (not shown).

After the beets have been topped, they are lifted out of the ground by suitable digging plow shovels 76, carried by beams 77 having their forward ends fulcrumed on the shaft 47. The plow shovels 76 may be lifted out of the earth by a lever 78 pivotally mounted on the shaft 40 and connected at its rear end to the upper end of a link 79 which is secured to one of the plow beams. A yoke 80 connects the beams 77 for joint movement. To hold the lever 78 down and the plows 76 in raised position, I have provided the lever with a pin 81 which engages and is secured by a latch 82 carried by a bracket 83, secured to one of the braces 39.

The mechanism heretofore described, is driven from a sprocket 84 on the rear axle of the machine, and a sprocket chain 85 passes around said sprocket and around a sprocket 86, which is loosely mounted on the shaft 47. In order that sprocket 86 may turn the shaft 47, I have provided the outer face of said sprocket with teeth, which are engaged by the teeth 87 of a clutch collar 88, which is keyed to the shaft 47 for longitudinal movement and is provided at its outer end with an annular flange 89, as best shown in Fig. 7. Mounted on said clutch collar 88 between the flange 89 and the sprocket 86, is a loose sleeve 90 having oppositely disposed pins 91 and mounted on the shaft 47 between the flange 89 and a fixed washer 92, is a spring 93 which forces said clutch collar 88 toward the sprocket 86 and permits the teeth of the sprocket to turn the clutch collar 88 and with it shaft 47, cutting disks 70 and leveling wheel 71.

The means for throwing said clutch out of operation consist of an arm 94, which is rigidly mounted on the left hand vertically movable block 46 and carries at its outer end a vertical pin or post 95. A lever 96 is pivotally mounted on said post 95, and has its outer end forked and provided with diagonal slots 97 in which the pins 91 work. It will be apparent that each time the lever 96 is swung, the pins 91 will travel in the slots 97 and throw the clutch either in or out, as the case may be. The clutch is controlled by a foot lever 98, which is pivoted to one side of the frame and is pivotally connected intermediate its ends to a link 99, that is pivotally connected at its rear end to the lever 96.

A sprocket 100 is rigidly secured upon the shaft 47 and a sprocket chain 101 connects said sprocket 100 with the sprocket 4 on the shaft 3, so that, when the clutch is in operative position, and the machine travels forward, the shaft 3 operates the flattening roller 5 and cutting disks 23.

The operator's seat 105 is shown in full lines in Fig. 1 and in dotted lines, and it is supported above the frame by rigid metal straps 106 shown in full lines in Fig. 1 and in dotted lines in Fig. 2 which extend upwardly and rearwardly from frame supported brackets 17.

From the foregoing, it is thought that the operation of the machine will be apparent, without further description.

What I claim and desire to secure by Letters Patent is:—

1. The combination with a beet harvester, of means for elevating the beets in the soil before they have been topped, means for penetrating the beet crowns and for forcing the elevated beets back into the soil until their crowns are at a uniform height or level, and means for cutting the same amount of top from the beets, said penetrating and forcing means also conveying the tops after they have been severed.

2. In a beet harvesting and topping machine, the combination with means for elevating the beets in the soil, of a single means for depressing the elevated beets back into the earth until their crowns are a uniform height or level and for conveying the beet crowns after the beets have been topped, and means for topping the beets.

3. In a beet harvester and topping machine, the combination with means for elevating the beets, of a rotatable wheel having a spiked periphery for penetrating the beet crowns and for depressing the elevated beets back into the earth until their crowns are at a uniform height or level, and for conveying the beet crowns after the beets have been topped, and means for topping said beets.

4. In a beet harvesting machine, a traveling frame, means carried by said frame for elevating the beets a predetermined distance in the earth, a vertically adjustable wheel carried by said frame and provided on its periphery with spikes which are adapted to enter the crowns of the beets which have been raised and depress said beets back into the earth until their crowns are at a uniform height or level, and means for topping said beets, said spikes being adapted to convey the beet crowns after the beets have been topped.

5. A beet harvesting machine comprising a traveling frame, means carried by said frame for elevating the beets a predetermined distance in the soil, a horizontal shaft mounted in said frame, a plurality of vertically movable frames carried by said shaft, vertical shafts carried by said movable frames and provided with topping disks for severing the crowns of the beets, gearing connecting said vertical shafts and the horizontal shaft, and a leveling wheel rigidly mounted upon said horizontal shaft between said movable frames and provided on its periphery with spikes for penetrating the crowns of the raised beets and depressing said beets back into the earth until their crowns are at a uniform height or level before they have been topped by the disks, said wheel also conveying the beet tops after they have been severed.

In testimony whereof I affix my signature.

WILSON PRATT.

Copies of this patent may be obtained for five cents each, by addressing the "Commissioner of Patents, Washington, D. C."